No Printed Specification Available
9162X
J. O. Connor.
Scow.
No.
Patented Oct 14. 1835
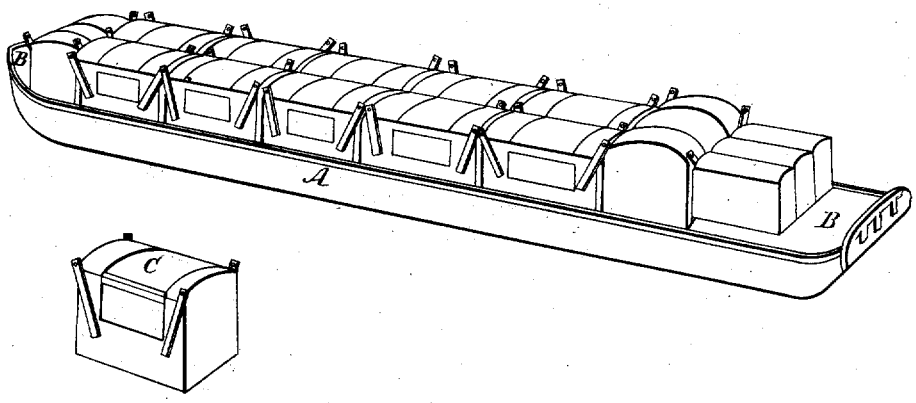
N. PETERS, PHOTO-LITHOGRAPHER, WASHINGTON, D. C.

9162X James O'Connor Oct. 14, 1835

Letters Patent

The Schedule referred to in these Letters Patent, and making part of the same, containing a description in the words of the said James O'Connor himself of his Improvement in Canal Boats for the Transhipment of Merchandize.

Schedule or Specification of James O'Connor's improved Canal Boat for carrying merchandize and general freight to be used when transhipment from Canal to Rail or other roads and vice versa is necessary.

Construct the hull of the Boat Flat or Schow in all respects similar to those used on the Canal to be navigated. Construct a short stern deck such as is used say four or five feet long next to which deck or close in 6 feet for a Cabbin. Also construct a short bow deck say four or five feet long.

These decks and Cabbin will occupy from fourteen to sixteen feet in length of the Boat, Schow, or Flat. The remaining or greater part of the Boat Schow or

13

9162X filling them again, thus the honey is secured in summer time, by the bowls
and drawers, in abundance; every morning one or the other bowl or drawer
can be removed without the slightest danger or trouble. As soon as the bees
have run their combs to the holes behind the doors, two other large bee hous-
es are screwed on, hole upon hole, behind the doors, with some of the abovemen-
tioned cement, thinly smeared around the holes; when the slides are remov-
ed, a great quantity of bees will come out of the full into the empty houses;
and after they have worked their way into the empty ones they are removed and
others replaced for the reception of more, &c. From the main body below,
the honey is taken in winter time, when a door is opened in a cold morning
before the palace is quite full, the bees will retire and become stiffened,
then the combs are cut through right in the middle, between the sticks.
with a sharp pointed, thin bended, tin plate, and a stick with its adhe-
sion removed, Thus a stick full can be taken out from the waxen banquet
halls every morning, until the one half end is conveyed away. In the spring
these sticks are all to be replaced; thus the honey of every other half end can
be taken out every winter. By pursuing this plan the bees continue in mak-
ing new combs. and filling up every other half end every summer; N.B. There
are some of these "fortifications" so large as to contain upwards of three hogs-
heads and commenced with eighteen hives, One hundred and sixty gallons
of honey have been taken out of one house in one year. The superiority of
this invention over any thing of the kind hitherto in use, is unquestionable.
and individuals who have made a trial of this plan all concur in saying
that the bees thrive better, and make ten times the quantity of honey which
they did on the former plans.

Know all Men by these Presents. That we the undersigned
have had a perfect trial and examination of Mr Grove's Patent Bee
House, two summers and we candidly believe that it will answer every
purpose, as it is recommended; any person wishing to see a honey comb
built in two summers, eight feet long and four wide can be gratified with
the sight by calling with us. Jacob Jackson. Cornelius Reichwine, Wm
Trout. Philip Gable, Reading Berks County Pa. December 7. 1834.
On this 26 th day of May 1835. before the subscriber, a Justice of the Peace in and

(58) 9162X and for said County, personally appeared the aforesaid William Groves and made solemn oath according to law, that he verily believes himself to be the true and original inventor or discoverer of the invention above specified and described for a Bee House, and that he is a citizen of the United States.

C. H. Wharton.

"Given under my hand at the City of Washington this 12th day of June A.D. 1835. Andrew Jackson By the President. John Forsyth, Secretary of State."

"I do certify that the foregoing Letters Patent, were delivered to me on the 13th day of June A.D. 1835, to be examined and I have examined the same and find them conformable to law B. F. Butler Attorney General of the United States 1950 words (Drawing) E.F. W.G.

James O'Connor Oct. 14, 1835
Letters Patent